Inventor
R. M. W. SITTON

By
Cameron, Kerkam & Sutton
Attorneys 3,486,114
INDICATING INSTRUMENTS WITH SCALE-LAW
CHANGING CIRCUIT
Robert Milo William Sitton, Wokingham, England, assignor to Ferranti Limited, Hollinwood, England, a company of Great Britain and Northern Ireland
Filed Dec. 11, 1967, Ser. No. 689,604
Claims priority, application Great Britain, Jan. 12, 1967, 1,651/67
Int. Cl. G01r 15/10; G06g 7/12
U.S. Cl. 324—132    10 Claims

ABSTRACT OF THE DISCLOSURE

A direct-current voltage-measuring indicating instrument includes circuit means for changing the scale-law of the instrument at a predetermined point on the scale. The circuit comprises a modified differential amplifier having full negative feedback applied to it.

---

This invention relates to a direct-current voltage-measuring indicating instrument having means for changing the scale-law of the instrument.

The majority of direct-current indicating instruments are made in such a manner that there is a linear relationship between the deflection of the instrument pointer and the value of the measured quantity. The scale-law relating deflection to measured value may be varied to emphasize the upper or lower part of the scale by suitable shaping of the pole-pieces of the instrument, but such a scale-law cannot readily be changed once the instrument has been assembled. Instruments which omit the lower part of the scale are known, and are called "suppressed zero" instruments.

It is sometimes desirable to emphasize the lower part of the scale whilst retaining the range of the instrument, in other words to reduce the sensitivity of the instrument as the deflection increases. This may be necessary, for example, to correct the law of a transducer used to give a voltage output for measuring some non-electrical quantity.

This may be done by supplying current to the instrument from an amplifier which has variable negative feedback. The problem with such an arrangement is that, whatever the gain of the amplifier, the scale law of the instrument will remain unchanged. In order to provide a continuous relationship between instrument deflection and the value of the measured quantity it is necessary to introduce an "offset" voltage each time the feedback of the amplifier is changed. This has the disadvantage of giving rise to a complex circuit.

An object of the invention is to provide means for varying the scale-law of a direct-current voltage-measuring instrument which does not suffer from the disadvantage stated above.

According to the present invention there is provided a direct-current voltage-measuring indicating instrument having means for changing the scale law of the instrument at a predetermined point on its scale, comprising a potential divider including at least two resistive components connected in series with one another and with the instrument movement across the voltage to be measured, and a differential amplifier including two transistors having their emitters connected together and to a source of constant current, the base of one transistor being connected to the junction of the two components of the potential divider, the base of the other transistor being connected to a source of reference potential appropriate to said predetermined point, and the output of the amplifier being connected directly to the base of said one transistor, whereby the differential amplifier is operable to stabilise the potential of said junction against changes of a predetermined polarity relative to the reference potential.

It should be noted that the term "direct-current indicating instrument" relates only to the actual instrument movement. The instrument may be used to measure alternating-current quantities if a rectifier or other device is used. Similarly the term "voltage-measuring" does not exclude the measurement of current, since this may be done by measuring the voltage drop across a low-resistance shunt.

The invention will now be described with reference to the accompany drawings, in which.

Figure 1:
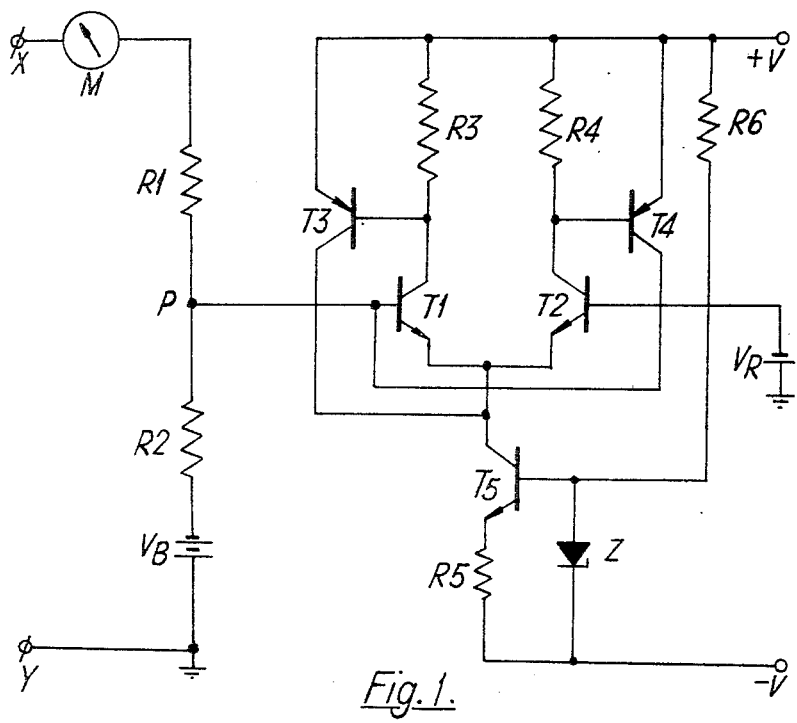
FIGURE 1 is a circuit diagram of an indicating instrument arranged to have its scale-law changed at a predetermined reference potential.

Referring now to FIGURE 1, X and Y denote the two terminals of the instrument to which the potential to be measured in connected. Between these two terminals are connected the meter movement M, two resistors R1 and R2, and a source of backoff potential $V_B$, all connected in series.

The control circuit of the instrument is built-up around a long-tailed pair comprising two npn transistors T1 and T2 and operating as a differential amplifier. The emitters of the two transistors are connected together and to a constant-current source described below. The collector of T1 is connected through a resistor R3 to a potential $+V$, and the collector of T2 is similarly connected through a resistor R4.

The base of T1 represents one input of the differential amplifier, and is connected to point P, the junction between resistors R1 and R2. The base of T2 represents the other input and is connected to the reference potential $V_R$.

Transistors T3 and T4 are pnp transistors and have their emitters connected to the potential $+V$. The base of T3 is connected to the collector of T1, and the base of T4 is connected to the collector of T2. The collector of T3 is connected to the common emitter connection of transistors T1 and T2. The collector of T4 represents the output of the amplifier, and is connected back to the base of T1 to provide full negative feedback. Transistor T3 provides stabilising feedback from T1 to the common emitters of T1 and T2.

The constant current source comprises an npn transistor T5 having its collector connected to the common emitter connection of transistors T1 and T2, and its emitter is connected through a resistor R5 to a potential $-V$. The base of T5 is connected to the potential $+V$ through a resistor R6, and to the potential $-V$ through a Zener diode Z.

Figure 2:
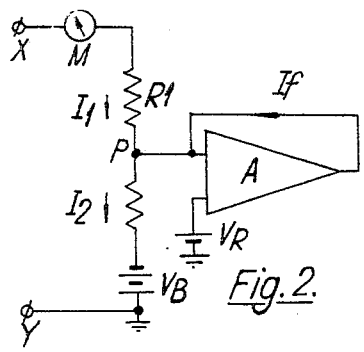
FIGURE 2 is a schematic diagram to illustrate the operation of the circuit of FIGURE 1.

FIGURE 2 is a schematic diagram of the circuit of FIGURE 1 and will be used to explain its operation. The circuitry of FIGURE 1 has largely been replaced by a single symbol representing the differential amplifier A, with its two inputs and full negative feedback.

Feedback current has been denoted as $I_f$, whilst the currents flowing in the upper and lower halves of the potential divider R1 and R2 respectively are shown as $I_1$ and $I_2$.

The operation of a normal differential amplifier with full negative feedback between one output and the other input and having one input connected to a reference potential is such as to maintain the other input at the reference potential. However, the differential amplifier shown in FIGURE 1 differs from this in that the other input is maintained at the reference potential only when it would otherwise be at a potential more negative than the reference potential. If for example point P, the junction of R1 and R2, rises above the potential on the base of T2, then the amplifier ceases to function.

Consider, for example, the case where there is no voltage applied between X and Y, and $V_R$ is zero, i.e., the base of T2 is earthed. Since terminal Y is connected to earth potential and point P is now a virtual earth, no current will flow through R1. Current will flow between point P and the source of back-off potential $V_B$ through R2, and this current $I_2$ will be the feedback current $I_f$ of the amplifier.

As the applied voltage $V_{XY}$ increases, a current $I_1$ will flow through the meter M and R1 to the virtual earth, and the circuit resistance is that of the meter plus $R_1$. The current $I_2$ flowing through $R_2$ is unchanged so long as point P remains a virtual earth. However the current $I_1$ also flows through $R_2$, and hence the feedback current $I_f$ falls to $(I_1-I_2)$. This situation continues until $V_{XY}$ rises to such a value that $I_1$ and $I_2$ are equal. At this point, the feedback current $I_f$ is zero. This situation is reached when $V_{XY}=V_B (R_1+R_2)/R2$. Under these conditions point P is held at earth potential by the potential divider as well as by the amplifier A. This value of $V_{XY}$ will hereafter be called the "changeover" voltage $Vc$.

The amplifier now ceases to control the potential at point P and the impedance of the circuit becomes that of the meter movement M plus both resistors R1 and R2. As the voltage measured continues to rise, the impedance remains at its new value. As soon as $V_{XY}$ falls to a value below the changeover voltage $Vc$ the amplifier A again maintains the point P as a virtual earth.

Figure 3:
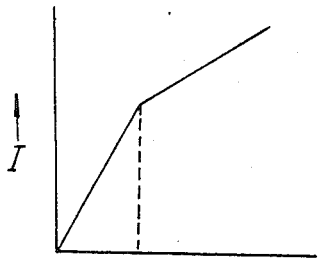
FIGURE 3 illustrates the relationship between pointer deflection and measured voltage of the arrangement of FIGURES 1 and 2.

FIGURE 3 illustrates the effect on the scale reading of the meter. The abscissa represents the measured voltage $V_{XY}$, whilst the ordinate represents the current flowing through the meter M. If the relationship between current and pointer deflection is linear, as in the ordinary moving-coil meter, the ordinate will also represent pointer deflection.

It will be seen from FIGURE 3 at some value of voltage $Vc$, the scale-law will change, causing the upper end of the scale to be compressed. If linear resistors are used in the potential divider the two scale-laws will both be linear, and only one will pass through the origin as shown. No offset voltage is necessary to produce a continuous relationship between voltage and current (or deflection).

If the reference potential is other than earth potential, then the changeover potential $Vc$ is given by the equation $$Vc=(V_B \pm V_R).(R1+R2)/R2$$

where the sign depends upon the relative polarities of the two voltage $V_B$ and $V_R$.

Figure 4:
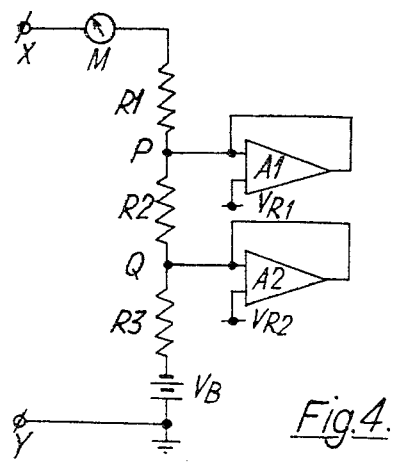
FIGURE 4 is a schematic diagram of an alternative embodiment of the invention.

It is possible to arrange for the scale-law to change at more than one point. FIGURE 4 illustrates a circuit arranged to change the scale-law of the meter at two points. The only changes to the circuit of FIGURE 2 are the addition of a third resistor R3 to the potential divider and a second differential amplifier A2 connected to the junction Q between R2 and R3. Amplifiers A2 and A1 are of the same type as amplifier A of FIGURE 2. The reference inputs of the two amplifiers are connected to potentials $V_{R1}$ and $V_{R2}$, $V_{R1}$ being more positive than $V_{R2}$.

Figure 5:
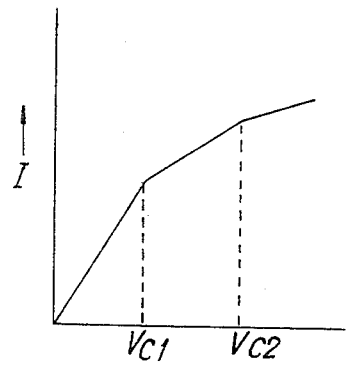
FIGURE 5 illustrates the relationship between deflection and voltage of the arrangement of FIGURE 4.

The circuit operates in the same way as that of FIGURE 2 already described, except that the scale-law change occurs at two points. As FIGURE 5 shows, amplifier A1 maintains the point P at the reference potential $V_{R1}$ until the applied voltage $V_{XY}$ reaches a value $Vc_1$. At this point amplifier A ceases to control the potential of point P and amplifier A2 takes over to maintain point Q at the reference potential $V_{R2}$. The circuit resistance is now increased by the value of R2. When the applied voltage $V_{XY}$ reaches a further value $Vc_2$ amplifier A2 ceases to control the potential of point Q, and the circuit resistance is increased by the value of R3.

It will be apparent that more than two amplifiers may be used to increase the number of changeover points still further.

The two circuits considered so far, with reference to FIGURES 2 and 4, have been concerned with measuring positive voltages (terminal X positive with respect to terminal Y) and with causing compression of the upper part of the meter scale. The same basic circuit may also be used to measure negative voltages, or to produce expansion of the upper part of the meter scale. For example, using the circuit of FIGURE 2, it is possible to measure positive voltages with upper-scale expansion. The amplifier A is modified so as to deliver current only when point P is maintained at a potential more positive than the reference potential. This is the opposite condition to that under which the amplifier of FIGURE 2 would operate. No back-off voltage $V_B$ is required, terminal Y being connected directly to the bottom end of resistor R2.

In the case of measurement of a negative voltage with upper-scale compression, the modified differential amplifier is again used, but a back-off voltage $V_B$ is again necessary. However this must be connected with reverse polarity to that shown in FIGURE 2. If the reference potential is other than earth, then its polarity must be reversed as compared to that necessary for measuring positive voltage.

Finally, in order to measure negative voltages with upper-scale expansion, the original differential amplifier of FIGURE 1 is used, with no back-off voltage $V_B$. As in the previous instance, if the reference potential is other than earth, then its polarity must be reversed compared to that necessary for measuring positive voltages.

In the above description the components of the potential divider have been resistors, and hence the scale-laws have been substantially linear. However other circuit components may be used to produce scale-laws of different form, for example a logarithmic relationship between deflection and measured voltage may be provided.

What I claim is:

1. A direct-current voltage-measuring indicating instrument having means for changing the scale law of the instrument at a predetermined point on its scale, comprising a potential divider including at least two resistive components connected in series with one another and with the instrument movement across the voltage to be measured, and a differential amplifier including two transistors having their emitters connected together and to a source of constant current, the base of one transistor being connected to the junction of the two components of the potential divider, the base of the other transistor being connected to a source of reference potential appropriate to said predetermined point and the output of the amplifier being connected as negative feedback to the base of said one transistor, said differential amplifier being operable to stabilize the potential of said junction against changes of a predetermined polarity relative to the reference potential.

2. An indicating instrument as claimed in claim 1 which includes in addition to said differential amplifier at least one further differential amplifier and in said potential divider one further resistive component forming at least two pairs of resistive components connected in series with one another and with the instrument movement across the voltage to be measured, each said amplifier having the base of one transistor connected to the junction between a different pair of components of the potential divider and having the base of the other transistor connected to a reference potential of different value from the first-mentioned reference potential.

3. An indicating instrument as claimed in claim 2 in which a source of back-off potential is connected in series with the instrument movement.

4. An indicating instrument as claimed in claim 2 wherein the scale laws are determined by the characteristics of the resistive components of the potential divider.

5. An indicating instrument as claimed in claim 1 in which a source of back-off potential is connected in series with the instrument movement.

6. An indicating instrument as claimed in claim 1 wherein the scale law is determined by the characteristics of the resistive components of the potential divider.

7. A direct-current voltage-measuring instrument having means for controlling the scale law of the instrument at a predetermined point on its scale comprising a potential divider including at least two resistive components connected in series with one another and with the instrument movement across the voltage to be measured, at least one differential amplifier, a constant current source connected to said differential amplifier, said differential amplifier having a first and a second input and full negative feedback between its output and said first input, said first input being connected to the junction of said two resistive components, said second input being connected to a reference potential such that said differential amplifier is operable only when the potential of said junction is at a predetermined magnitude and polarity relative to said reference potential.

8. An indicating instrument as set forth in claim 7 wherein said voltage divider includes at least one further resistive element connected in series with said two resistive components and at least one other differential amplifier having a constant current source connected thereto and including a pair of input terminals and full negative feedback between its output and one of said input terminals, said one of said input terminals being connected to the junction of said further resistive element and one of said two resistive elements and said other input terminal being connected to a reference potential of different value from said first mentioned reference potential such that said other differential amplifier is operable only when said last-mentioned junction is at a predetermined value relative to said reference potential of different value.

9. An indicating instrument as set forth in claim 8 in which a source of back-off potential is connected in series with the instrument movement.

10. An indicating instrument as set forth in claim 9 wherein the scale laws are determined by the characteristics of the resistive components of the potential divider.

References Cited

UNITED STATES PATENTS

| 2,824,286 | 2/1958 | Burt | 324—132 |
| 2,895,046 | 7/1959 | Martin | 328—142 |
| 3,260,955 | 7/1966 | Offner | 330—69 |

ALFRED E. SMITH, Primary Examiner

U.S. Cl. X.R.

328—142